(12) United States Patent
Xie et al.

(10) Patent No.: US 8,595,558 B2
(45) Date of Patent: Nov. 26, 2013

(54) COMPUTER TURN ON/OFF TESTING APPARATUS

(75) Inventors: Ling-Yu Xie, Shenzhen (CN); Xing-Ping Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 406 days.

(21) Appl. No.: 12/966,227

(22) Filed: Dec. 13, 2010

(65) Prior Publication Data
US 2012/0047399 A1    Feb. 23, 2012

(30) Foreign Application Priority Data
Aug. 23, 2010    (CN) .......................... 2010 1 0260080

(51) Int. Cl.
*G06F 11/00* (2006.01)

(52) U.S. Cl.
USPC ................... 714/36; 714/14; 714/23; 714/24; 714/47.1

(58) Field of Classification Search
USPC ......... 714/14, 23, 24, 25, 36, 47.1, 47.2, 47.3
See application file for complete search history.

(56) References Cited

U.S. PATENT DOCUMENTS

| | | | |
|---|---|---|---|
| 2006/0230316 A1* | 10/2006 | Lu et al. .......................... | 714/36 |
| 2007/0021848 A1* | 1/2007 | Huang ............................ | 700/22 |
| 2008/0209271 A1* | 8/2008 | Liu et al. ........................ | 714/36 |
| 2010/0088547 A1* | 4/2010 | Chang ............................ | 714/36 |
| 2010/0306592 A1* | 12/2010 | Wang ............................. | 714/36 |

OTHER PUBLICATIONS

Lazaridis, Giorgos; Basic Transistor Circuits, PCB Heaven, www.pcbheave.com/wikipages/Transistor_Circuits/; Feb. 24, 2009, pp. 1-10.*

\* cited by examiner

*Primary Examiner* — Joseph D Manoskey
(74) *Attorney, Agent, or Firm* — Altis & Wispro Law Group, Inc.

(57) ABSTRACT

A computer turning on/off testing apparatus for turning on a computer automatically includes a control module, a switch module, and a power supply module. The control module outputs control signals and receives a turn on signal from the computer to determine whether the computer turns on successfully. The switch module receives the control signals and turns on/off the computer according to the control signals. The power supply module provides power to the control module and the switch module. The control module stores a predetermined test time. The control module records abnormal information and test times when the computer turns on/off, and outputs the control signals to turn on the computer again when the computer cannot restart. The computer is turned on and off until a turning on/off time of the computer is equal to the predetermined test time.

7 Claims, 2 Drawing Sheets

COMPUTER TURN ON/OFF TESTING APPARATUS

BACKGROUND

1. Technical Field

The disclosure generally relates to a computer turn on/off testing apparatus, especially to a computer turn on/off testing apparatus used to turn on/off a computer automatically.

2. Description of Related Art

Most electronic apparatuses are not equipped with internal power supply devices in order to save space and cost. Therefore, these electronic apparatuses require external power supplies. Computers are powered by power supplies, which are capable of converting alternating current into direct current. Testing power supplies during the computer turn on/off processes is an important test for determining reliability. If the computer cannot be turned on, or if the computer is turned on for a long time; the power supplies then need to be further tested. However, the above testing method requires an engineer to operate a power button on the computer repeatedly to turn on/off the computer, which is inefficient and expensive.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
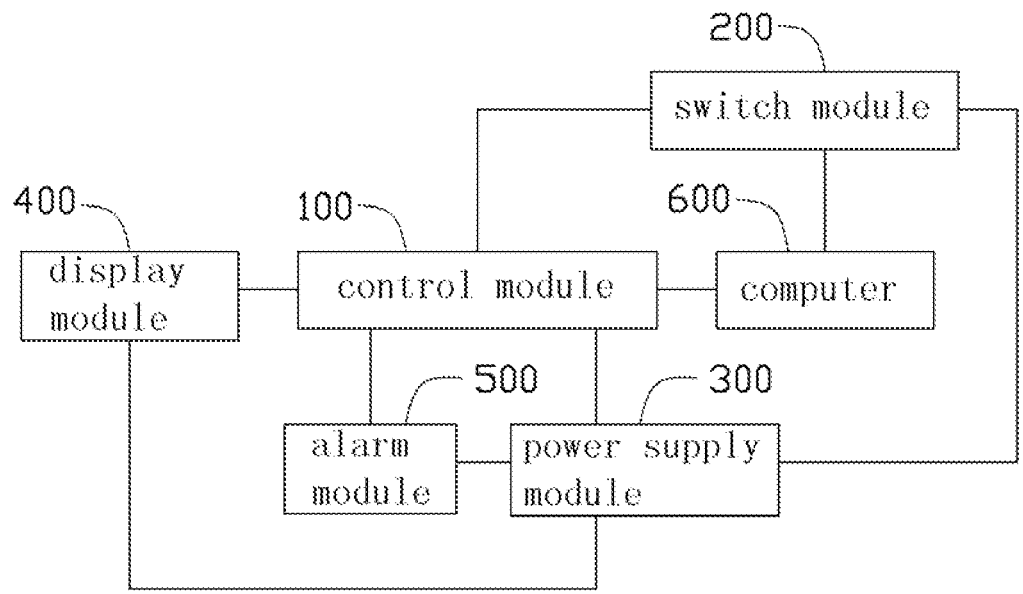
FIG. 1 is a block diagram of an embodiment of a computer turn on/off testing apparatus.

Referring to FIG. 1, an embodiment of a computer turn on/off testing apparatus for testing a computer 600 includes a control module 100, a switch module 200, a power supply module 300, a display module 400 and an alarm module 500. The control module 100 is configured to output control signals, and receives a turn on signal from the computer 600 to determine whether the computer 600 is turned on successfully. The switch module 200 is configured to receive the control signals and turns on or off the computer 600 according to the received control signals. The power supply module 300 is configured to provide working voltages to the control module 100 and the switch module 200. The control module 100 stores a predetermined testing time therein. The control module 100 is configured to record abnormal information and test times during the computer 600 turn on/off processes. The control module 100 is configured to turn on the computer 600 again when the computer 600 cannot be turned on. The display module 400 is configured to receive and display the abnormal information and test times. The alarm module 500 is configured to send a warning when the computer 600 cannot be turned on.

Figure 2:
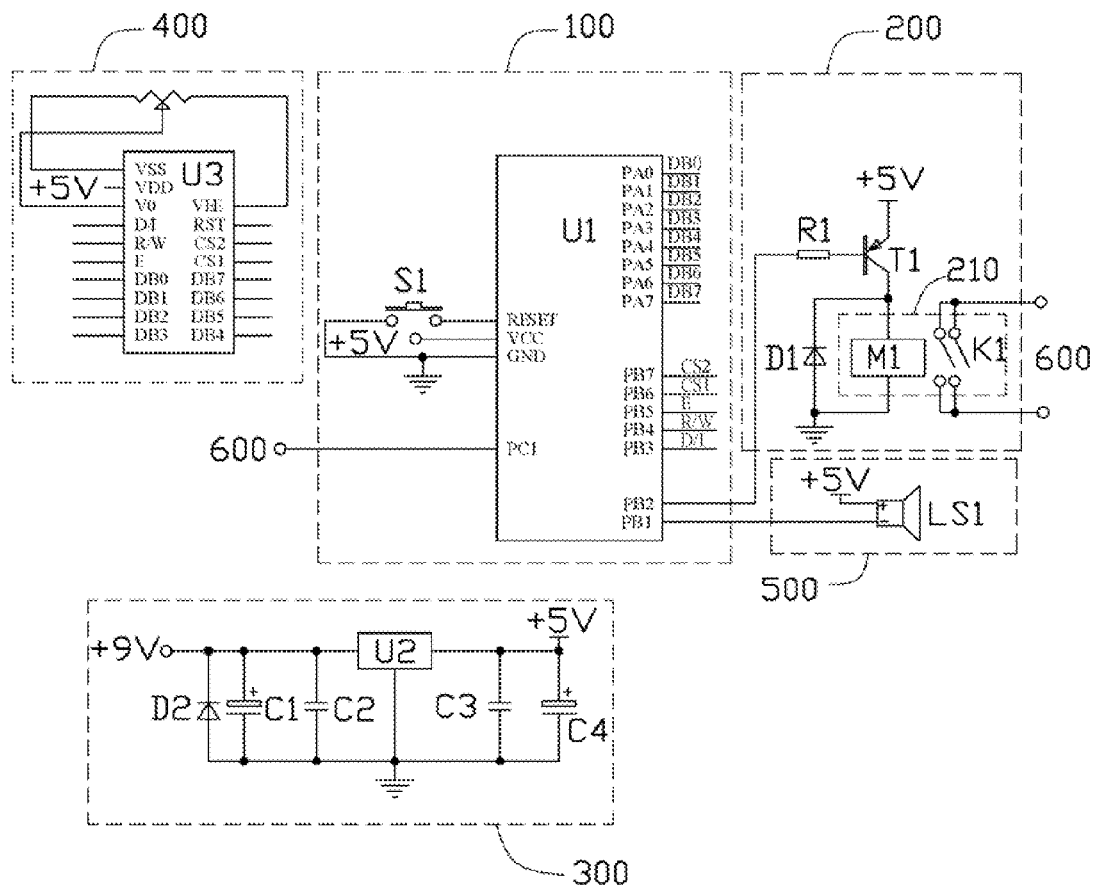
FIG. 2 is a circuit view of an embodiment of the computer turn on/off testing of FIG. 1.

Referring to FIG. 2, the control module 100 includes a micro controller U1 and a reset switch S1. The micro controller U1 includes a number of serial signal output terminals PA0~PA7, an alarm signal output terminal PB1, a control signal output terminal PB2, a turn on signal input terminal PC1, a reset signal output terminal RESET, a first ground terminal GND and a first power terminal VCC. The control module 100 is configured to convert the abnormal information and test times to serial data signals which are output by the number of serial signal output terminals PA0~PA7. When the computer 600 cannot be turned on, the control module 100 outputs an alarm signal via the alarm signal output terminal PB1. The control signal output terminal PB2 is configured to output control signals. The turn on signal input terminal PC1 is configured to receive the turn on signal. The reset signal output terminal RESET is electrically connected to the first ground terminal GND by the reset switch S1. The first power terminal VCC is configured to receive a +5V working voltage from the power supply module 300. In one embodiment, the micro controller U1 is an ATmega16 type single chip produced by ATMEL Corporation of America. The micro controller U1 is reset by closing the reset switch S1.

The switch module 200 includes a transistor T1, a relay 210, a diode D1 and a resistor R1. The relay 210 includes a coil unit M1 and a switch unit K1. A transistor base is electrically connected to the control signal output terminal PB2 by the resistor R1. A transistor emitter is configured to receive the +5V working voltage. A transistor collector is grounded via the coil unit M1. The switch unit K1 is electrically connected to a power button of the computer 600. A diode D1 cathode is electrically connected to the transistor collector. A diode D1 anode is grounded. In one embodiment, the transistor T1 is a pnp type transistor.

The power supply module 300 includes a voltage regulator U2, a second diode D2 and capacitors C1~C4. The voltage regulator U2 includes an input terminal, a second ground terminal and an output terminal. The voltage regulator input terminal is electrically connected to the voltage regulator second ground terminal by the capacitors C1 and C2 respectively. The voltage regulator input terminal is electrically connected to a diode D2 cathode. A diode D2 anode is electrically connected to the voltage regulator second ground terminal. The voltage regulator output terminal is electrically connected to the voltage regulator second ground terminal by the capacitors C3 and C4 respectively. The voltage regulator input terminal is electrically connected to a voltage adapter (not shown). The voltage regulator output terminal provides the +5V working voltage to the control module 100, the switch module 200, the display module 400 and the alarm module 500. In this embodiment, the voltage adapter (not shown) converts a 220V AC voltage to a 9V DC voltage. The diode D2 is used to protect the voltage regulator U2 from being damaged when the voltage adapter (not shown) is wrongly connected to the 220V AC voltage.

The display module 400 includes a display chip U3. The display chip U3 includes a number of serial signal input terminals DB0~DB7 and a second power terminal VDD. The number of serial signal input terminals DB0~DB7 are electrically connected to the number of serial signal output terminals PA0~PA7 respectively. The number of serial signal input terminals DB0~DB7 are configured to receive the abnormal information and test times from the control module 100. The second power terminal VDD is configured to receive the +5V working voltage. In one embodiment, the display module 400 is a GXM12864 type LCD produced by GUO XIAN Electronic company of China.

The alarm module 500 includes a buzzer LS1. A buzzer anode is configured to receive the +5V working voltage. A buzzer cathode is electrically connected to the alarm signal output terminal PB1.

In use, the micro controller U1 outputs a low voltage level control signal to the switch module 200 by the control signal output terminal PB2. The transistor T1 turns on and the coil unit M1 of the relay 210 is powered up. The coil unit M1 closes the switch unit K1 of the relay 210. The power button of the computer 600 is closed and the computer 600 turns on. The computer 600 outputs the turn on signal to the micro controller U1 by the turn on signal input terminal PC1. When the computer 600 enters operation system, the micro controller U1 outputs high voltage level control signal to the switch module 200. The transistor T1 turns off and the coil unit M1 of the relay 210 is powered off. The coil unit M1 opens the switch unit K1 of the relay 210. The power button of the computer 600 is switched off and the computer 600 turns off again.

During the turn on/off processes of the computer 600; if the computer 600 cannot be turned on, the control module 100 records the abnormal information and test times, and converts the abnormal information and test times to serial data signals which are output by the number of serial signal output terminals PA0~PA7. The display module 400 receives the serial data signals and displays the abnormal information and test times. The micro controller U1 outputs a low voltage level warning signal to the alarm module 500 via the alarm signal output terminal PB1. The cathode of the buzzer LS1 receives the low voltage level warning signal and the buzzer LS1 sounds. When the computer 600 cannot be turned on, the micro controller U1 outputs a low voltage level control signal to the switch module 200 via the control signal output terminal PB2. The computer 600 turns on again. The computer 600 turns on and off repeatedly until a turn on/off time of the computer 600 is equal to the predetermined test time. When the test is complete, the micro controller U1 outputs a low voltage level test complete signal to the alarm module 500 by the alarm signal output terminal PB1. The cathode of the buzzer LS1 receives the low voltage level testing complete signal and the buzzer LS1 sounds.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer turn on/off testing apparatus for turning on a computer, comprising:
    a control module configured to output control signals and receive a turn on signal from the computer to determine whether the computer turns on successfully;
    a switch module comprising a PNP transistor and a relay; the relay comprising a coil unit and a switch unit; a transistor base electrically connected to the control module, and a transistor collector grounded by the coil unit, wherein the switch unit is electrically connected to the computer; the PNP transistor is configured to be turned on/off, which turns on/off the switch unit, according to the control signals; and the switch unit turns on/off the computer; and
    a power supply module configured to provide power to the control module and the switch module;
    wherein the control module is configured to store a predetermined test time; the control module is configured to record abnormal information and test times when the computer turns on/off; the control module is configured to output the control signals to turn on the computer again when the computer cannot restart; and the computer is turned on and off until a turn on/off time of the computer is equal to the predetermined test time;
    the control module comprises a micro controller and a reset switch; the micro controller comprises a control signal output terminal and a turn on signal input terminal; the control signal output terminal is configured to output the control signals; the turn on signal input terminal is configured to receive the turn on signal; the micro controller further comprises a reset signal output terminal, a first ground terminal and a first power terminal; the reset signal output terminal is electrically connected to the first ground terminal via the reset switch; the first power terminal is configured to receive a working voltage from the power supply module;
    a transistor emitter configured to receive the working voltage; the switch unit is electrically connected to a power button of the computer;
    the switch module further comprises a first diode; a first diode cathode is electrically connected to the transistor collector and a first diode anode is grounded;
    the power supply module comprises a voltage regulator and a second diode; the voltage regulator comprises a voltage regulator input terminal, a second ground terminal, and a voltage regulator output terminal; the voltage regulator input terminal is electrically connected to a second diode cathode; a second diode anode is electrically connected to the second ground terminal; the voltage regulator output terminal is electrically connected to the second ground terminal via a capacitor; the voltage regulator input terminal is electrically connected to a voltage adapter and the voltage regulator output terminal is configured to provide the working voltage to the control module and the switch module.

2. The computer turn on/off testing apparatus of claim 1, wherein the coil unit is powered up to switch on the switch module when the transistor is turned on; the coil unit is power off to switch off the switch module when the transistor is turned off.

3. The computer turn on/off testing apparatus of claim 1, further comprising a display module configured to receive and display the abnormal information and test times.

4. The computer turn on/off testing apparatus of claim 1, further comprising an alarming module configured to send an alarm signal when the computer cannot be turned on.

5. A computer turn on/off testing apparatus for turning on a computer, comprising:
    a control module configured to output control signals and receive a turn on signal from the computer to determine whether the computer turns on successfully;
    a switch module comprising a PNP transistor and a relay; the relay comprising a coil unit and a switch unit; a transistor base electrically connected to the control module, and a transistor collector grounded by the coil unit, wherein the switch unit is electrically connected to the computer; the PNP transistor is configured to be turned on/off, which turns on/off the switch unit, according to the control signals; and the switch unit turned on/off the computer; and
    an alarming module configured to send an alarm signal when the computer cannot be turned on;
    a display module, wherein the control module is configured to store a predetermined test time; the control module is configured to record abnormal information and test times when the computer turns on/off; the control module is configured to output the control signals to turn on the computer again when the computer cannot restart; and the computer is turned on and off until a turn on/off time of the computer is equal to the predetermined test time, and the test times and the abnormal information are displayed on the display module;

the control module comprises a micro controller and a reset switch; the micro controller comprises a control signal output terminal and a turn on signal input terminal; the control signal output terminal is configured to output the control signals; the turn on signal input terminal is configured to receive the turn on signal; the micro controller further comprises a reset signal output terminal, a first ground terminal and a first power terminal; the reset signal output terminal is electrically connected to the first ground terminal via the reset switch; the first power terminal is configured to receive a working voltage from the power supply module;

a transistor emitter configured to receive the working voltage; the switch unit is electrically connected to a power button of the computer;

the switch module further comprises a first diode; a first diode cathode is electrically connected to the transistor collector and a first diode anode is grounded;

the power supply module comprises a voltage regulator and a second diode; the voltage regulator comprises a voltage regulator input terminal, a second ground terminal, and a voltage regulator output terminal; the voltage regulator input terminal is electrically connected to a second diode cathode; a second diode anode is electrically connected to the second ground terminal; the voltage regulator output terminal is electrically connected to the second ground terminal via a capacitor; the voltage regulator input terminal is electrically connected to a voltage adapter and the voltage regulator output terminal is configured to provide the working voltage to the control module and the switch module.

6. The computer turn on/off testing apparatus of claim 5, further comprising a power supply module configured to provide power to the control module and the switch module.

7. The computer turn on/off testing apparatus of claim 5, wherein the coil unit is powered up to switch on the switch module when the transistor is turned on; the coil unit is powered off to switch off the switch module when the transistor is turned off.

* * * * *